United States Patent
Bykhovoy et al.

(10) Patent No.: US 11,769,353 B2
(45) Date of Patent: Sep. 26, 2023

(54) DRIVING MONITORING AND DETECTION SYSTEM

(71) Applicant: J. J. KELLER & ASSOCIATES, INC., Neenah, WI (US)

(72) Inventors: Roman Bykhovoy, Menasha, WI (US); William Lundquist, Little Chute, WI (US)

(73) Assignee: J.J. KELLER & ASSOCIATES, INC., Neenah, WI (US)

( * ) Notice: Subject to any disclaimer, the term of this patent is extended or adjusted under 35 U.S.C. 154(b) by 372 days.

(21) Appl. No.: 17/070,567

(22) Filed: Oct. 14, 2020

(65) Prior Publication Data

US 2022/0114844 A1    Apr. 14, 2022

(51) Int. Cl.
*G07C 5/00*    (2006.01)
*H04W 4/44*    (2018.01)
*G07C 5/08*    (2006.01)
*H04M 1/72409*    (2021.01)

(52) U.S. Cl.
CPC ............ *G07C 5/008* (2013.01); *G07C 5/085* (2013.01); *H04W 4/44* (2018.02); *H04M 1/72409* (2021.01)

(58) Field of Classification Search
CPC ... G07C 5/008; G07C 5/085; H04M 1/72409; H04M 1/724098; H04W 4/44
See application file for complete search history.

(56) References Cited

U.S. PATENT DOCUMENTS

| | | | |
|---|---|---|---|
| 9,311,271 B2 | 4/2016 | Wright | |
| 9,805,601 B1 * | 10/2017 | Fields | G08G 1/096827 |
| 9,947,147 B1 | 4/2018 | Kwak | |
| 10,068,457 B2 * | 9/2018 | Vega | H04W 4/02 |
| 10,085,113 B1 * | 9/2018 | Harter | G07C 5/0841 |
| 10,373,402 B2 | 8/2019 | Kwak | |
| 10,607,425 B2 | 3/2020 | Kwak | |
| 2017/0074987 A1 * | 3/2017 | Harter | G01S 19/14 |
| 2019/0156266 A1 * | 5/2019 | Hubbard | G06Q 10/06398 |

(Continued)

OTHER PUBLICATIONS

"Receive in-app ELD alerts—Reveal help center," Verizon Connect [online]. Retrieved from the Internet <URL: https://reveal-help.verizonconnect.com/hc/en-us/articles/360011302360-Receive-in-app-ELD-alerts>.*

*Primary Examiner* — Geepy Pe
*Assistant Examiner* — Kimia Kohankhaki
(74) *Attorney, Agent, or Firm* — Michael Best & Friedrich LLP

(57) ABSTRACT

A system for handling a driving while disconnected event. One example includes an electronic logging device configured to be connected to a vehicle and a mobile device. The mobile device includes an electronic processor configured to determine a connection status between the mobile device and the electronic logging device; determine movement of the mobile device; and determine whether the mobile device is connected to the electronic logging device based on the connection status. In response to determining the mobile device is not connected to the electronic logging device, the electronic processor generates driving information associated with a user of the mobile device and movement of the mobile device; transmits the driving information to an external device; and generates a user-perceivable notification to connect the mobile device to the electronic logging device.

20 Claims, 6 Drawing Sheets

(56) References Cited

U.S. PATENT DOCUMENTS

2019/0236510 A1\* 8/2019 Kwak .................. G07C 5/0841
2019/0236543 A1   8/2019 Warkentin
2019/0295333 A1   9/2019 Nista et al.

\* cited by examiner

DRIVING MONITORING AND DETECTION SYSTEM

BACKGROUND

In general, embodiments relate to monitoring a driving status of a vehicle, for example, a tractor-trailer truck. Some embodiments relating to monitoring whether a mobile device is connected to an electronic logging device of a vehicle while the vehicle is in motion.

The U.S. government requires drivers of trucks and other commercial vehicles to record information about their driving. For example, truck drivers must record the hours in which they drive a vehicle. The driver information is used to determine whether drivers are meeting regulations and compliance standards. In recent times, there has been an increase in drivers recording their information electronically. For example, a mobile device may monitor driver activity using information retrieved from an electronic logging device (ELD) of a vehicle.

SUMMARY

While ELD systems have many advantages, a driver of the vehicle may forget to connect their mobile device to the electronic logging device, resulting in an incorrect log.

One embodiment provides a system for handling what is referred to as "a driving while disconnected event." The system includes an electronic logging device configured to be connected to a vehicle and a mobile device including an electronic processor. The electronic processor is configured to determine a connection status between the mobile device and the electronic logging device, determine, using one or more sensors of the mobile device, movement of the mobile device, and determine whether the mobile device is connected to the electronic logging device based on the connection status. The electronic processor is configured, in response to determining the mobile device is not connected to the electronic logging device, to generate driving information associated with a user of the mobile device and movement of the mobile device. The electronic processor is also configured to transmit the driving information associated with the user of the mobile device and movement of the mobile device to an external device independent of the mobile device and the electronic device. The external device is configured to store data associated with the electronic logging device, generate a user-perceivable notification to connect the mobile device to the electronic logging device, and output the user-perceivable notification with an output of the mobile device.

In some embodiments, the electronic processor is further configured to, prior to outputting the user-perceivable notification, determine whether the mobile device has stopped moving. In some embodiments, the one or more sensors of the mobile device include a global positioning system. In some embodiments, the electronic processor is further configured to determine, based on a speed of the mobile device as determined by the global positioning system, whether a driving condition exists. In some embodiments, the driving information includes an identification of the user, a location of the mobile device, a date at which movement began, and a time at which movement began.

In some embodiments, the electronic processor is further configured to, after determining the mobile device is not connected to the electronic logging device, determine the mobile device is connected to the electronic logging device, generate updated driving information associated with the user of the mobile device and movement of the mobile device, and transmit the updated driving information associated with the user of the mobile device and movement of the mobile device to the external device. In some embodiments, the updated driving information includes an identification of the user, a location of the mobile device, a date at which movement ended, and a time at which movement ended. In some embodiments, the electronic processor is further configured to transmit the driving information associated with the user of the mobile device and movement of the mobile device to an administrator associated with the mobile application. In some embodiments, the electronic processor determines movement of the mobile device by determining the mobile device is traveling at a speed greater than or equal to ten miles per hour over a time period of thirty seconds. In some embodiments, the external device is a server configured to generate a driving report based on the driving information associated with the user of the mobile device and the movement of the mobile device.

One embodiment provides a method for handling what is referred to as "a driving while disconnected event." The method includes determining a connection status between a mobile device and an electronic logging device, determining, using one or more sensors of the mobile device, movement of the mobile device, and determining whether the mobile device is connected to an electronic logging device of a vehicle based on the connection status. The method also includes, in response to determining the mobile device is not connected to the electronic logging device, generating driving information associated with a user of the mobile device and movement of the mobile device, transmitting the driving information associated with the user of the mobile device and movement of the mobile device to an external device independent of the mobile device and the electronic logging device, generating a user-perceivable notification to connect the mobile device to the electronic logging device, and outputting the user-perceivable notification with an output device of the mobile device.

In some embodiments, the method includes, prior to generating the user-perceivable notification to connect the mobile device to the electronic logging device, determining whether the mobile device has stopped moving. In some embodiments, the one or more sensors of the mobile device include a global position system. In some embodiments, the method also includes determining, based on a speed of the mobile device as determined by the global positioning system, whether a driving condition exists. In some embodiments, the driving information includes an identification of the user, a location of the mobile device, a date at which movement began, and a time at which movement began.

In some embodiments, the method also includes connecting the mobile device to the electronic logging device, generating updated driving information associated with the user of the mobile device and movement of the mobile device, and transmitting the updated driving information associated with the user of the mobile device and movement of the mobile device to the external device. In some embodiments, the updated driving information includes an identification of the user, a location of the mobile device, a date at which movement ended, and a time at which movement ended. In some embodiments, the method further includes transmitting the driving information associated with the user of the mobile device and movement of the mobile device to an administrator associated with the mobile application. In some embodiments, detecting movement of the mobile device also includes determining the mobile device is traveling at a speed greater than or equal to ten miles per hour over a time period of thirty seconds. In some embodiments, the external device is a server, and the method includes generating, with the server, a driving report based on the data associated with the user of the mobile device and the movement of the mobile device.

Other aspects will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The government and the trucking industry require its drivers to record information detailing the amount of time they drive in a given day. This includes a driver's total time driving and resting and is used to identify compliance issues. The trucking industry has shifted to using electronic logging devices (ELDs) to determine hours of service. The use of ELDs enables trucking companies to have real-time information on their drivers and has the potential to provide a more robust understanding of problematic areas. To identify which driver is driving a given truck, mobile applications on the driver's mobile device can connect to the ELD. This associates the driver's identification number with the truck for a given shift. However, driver's may fail to connect their mobile device to the ELD, resulting in an inaccurate driving log. This can have a cascading effect of other drivers having log issues if they inadvertently claim incorrect driving time.

Accordingly, various embodiments provide, among other things, a system and method of monitoring and detecting a disconnected while driving event. A driving event is detected based on the speed of the mobile device. If the mobile device is not connected to the ELD, a driving while disconnected event is detected. An application of the mobile device then generates driving information unique to the user of the mobile device and transmits the generated driving information to a server. The driving information may also be provided to an administrator of the server. Once the mobile device has stopped moving, the driver is provided with a notification to connect the mobile device to the ELD. Accordingly, information related to the driving event is stored, and the user can drive safely without distraction.

Figure 1:
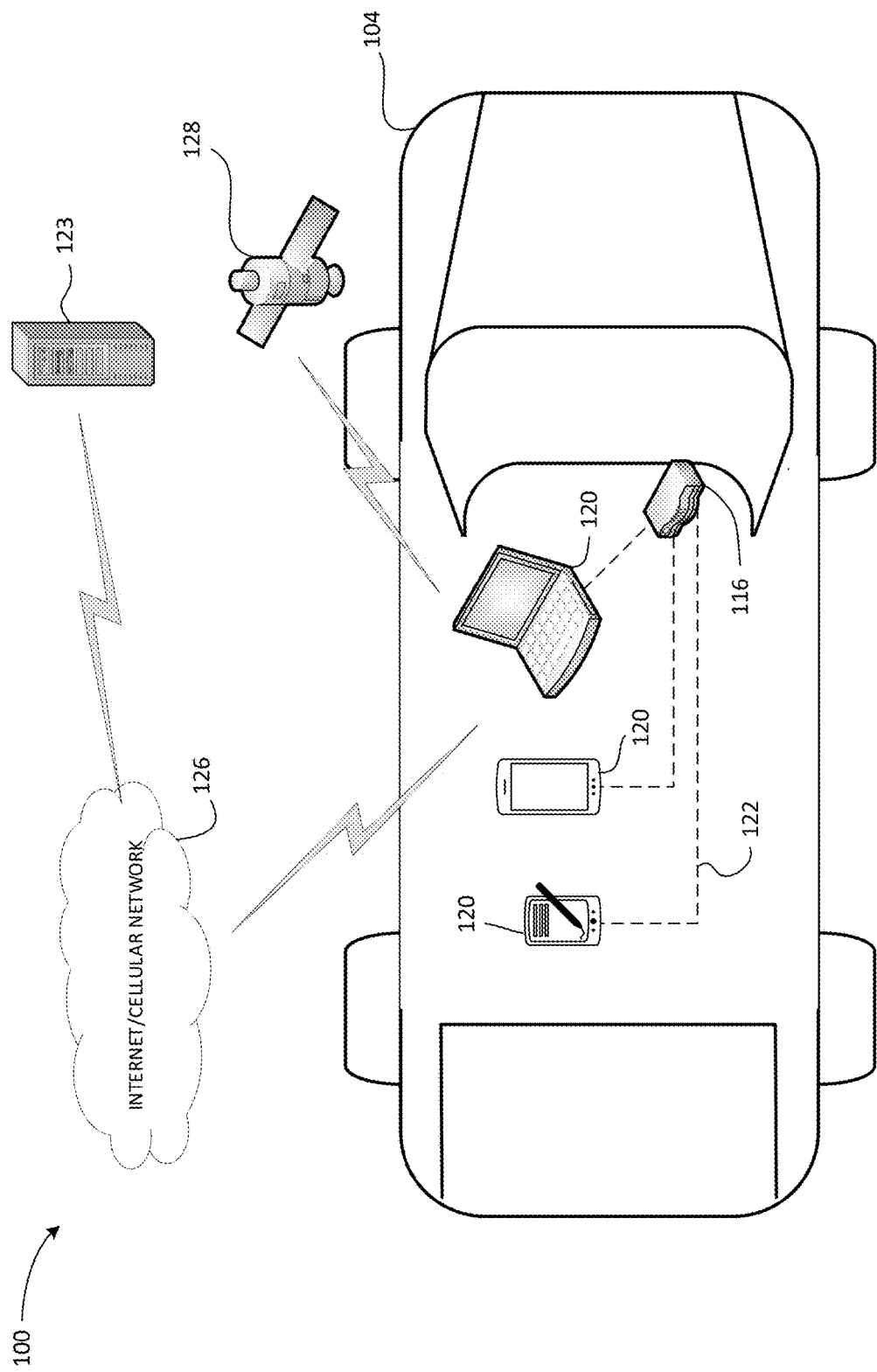
FIG. 1 is a schematic diagram of a system of monitoring a driving condition, according to some embodiments.

FIG. 1 is a schematic illustration of a system 100 for monitoring a driving condition. The system includes one or more ELDs 116 mounted or otherwise positioned in a vehicle 104. The vehicle 104 may be, for example, a transport truck for transporting goods. Although only one ELD 116 is depicted in FIG. 1, it will be understood by one skilled in the art that other ELDs 116 may be configured in a similar manner as the ELD 116 illustrated in FIG. 1. The ELD 116 tracks driver and vehicle data and wirelessly transmits the data to a remote server 123 via the internet and/or a cellular network (hereinafter "network") 126. The remote server 123 stores driving information associated with a plurality of drivers and a fleet of vehicles similar to vehicle 104.

In some embodiments, the ELD 116 communicates with the assistance of mobile device(s) 120, such as a cellular phone, a tablet, or a computer. The ELD 116 communicates with the mobile devices 120 through a link 122, which may be a wired connection via a cable, such as a USB cable, or a wireless connection, such as a Bluetooth connection. The mobile devices 120 include a mobile application or program that enables drivers to log their information. For example, a driver may configure a mobile application on their personal mobile device 120. After logging in to the mobile application, such as with a username and password, the driver may input their vehicle number and shipping information prior to tracking their hours of service and location. In some embodiments, the mobile application includes a driver identification number associated with the user of the mobile application, the owner of the mobile device 120, and/or the driver of the vehicle 104.

The ELD 116 and the mobile devices 120 may communicate with a global position satellite (GPS) system 128 (e.g., global positioning system). The GPS system 128 provides information regarding the time and location of the vehicle 104 (and by extension, the driver) to the ELD 116 and the mobiles devices 120. Data collected from the GPS system 128 can help identify when a driver is in noncompliance with a company rule or government regulation. For example, the GPS system 128 can help identify movement of the mobile device 120, and therefore the vehicle 104. Movement of the mobile device 120, accompanied by a lack of connection between the mobile device 120 and the ELD 116, may indicate a driving while disconnected event.

Figure 2:
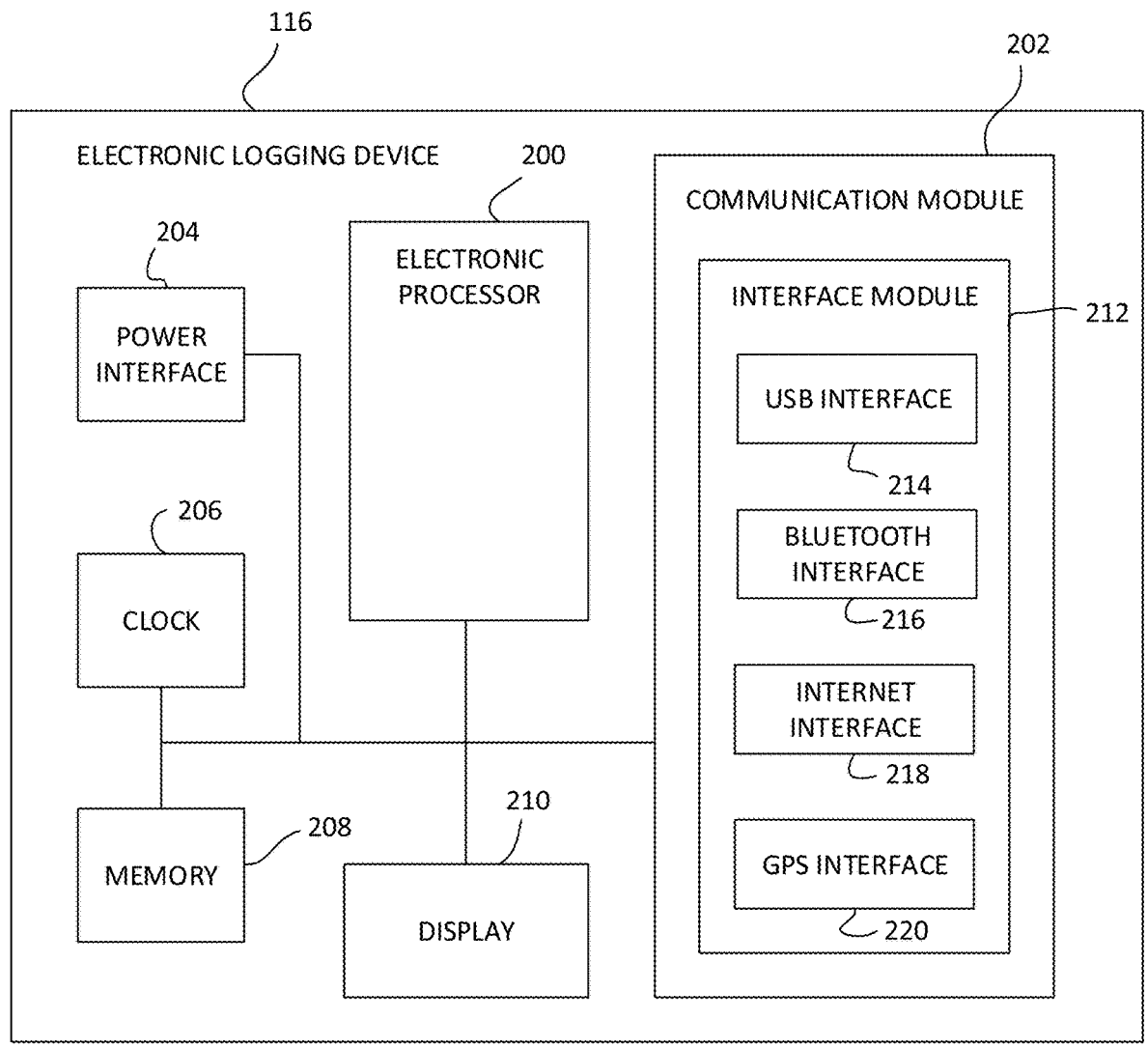
FIG. 2 is a block diagram of an electronic logging device, according to some embodiments.

FIG. 2 illustrates an example ELD 116 in a block diagram format. The ELD 116 includes a first electronic processor 200 (e.g., an electronic controller, a programmable microprocessor, a microcontroller, or other suitable device), a communication module 202, a power interface 204, a clock 206, a first memory 208 and a display 210. In other embodiments, the ELD 116 does not include all these features. For example, the ELD 116 may not include a clock 206 or a display 210. The first electronic processor 200 is configured to receive instructions and data from the first memory 208 and execute, among other things, instructions related to operation of the ELD 116. In particular, the first electronic processor 200 executes instructions stored in the first memory 208 to perform the methods described herein.

The communication module 202 includes an interface module 212 that includes a plurality of interfaces, such as a USB interface 214, an internet/cellular network interface (hereinafter "internet interface") 218, a Bluetooth™ interface 216 (or other short-range wireless connection), and a GPS interface 220. The USB interface 214 and the Bluetooth™ interface 216 are used to communicate with the mobile devices 120. In some embodiments, the USB interface 214 includes a B-type USB socket connector into which a USB cable can be inserted to allow the ELD 116 to communicate with devices such as the mobile devices 120. A connection between the ELD 116 and the mobile device 120 may be detected using the USB interface 214 and the Bluetooth™ interface 216. The GPS interface 220 is used to communicate with the GPS system 128. The internet interface 218 is used to communicate with and transport data through the network 126. In some embodiments, the interface module 212 does not include the internet interface 216 to transport data through the network 126, and instead relies on the mobile devices 120 to perform such features.

The first memory 208 includes read only memory (ROM), random access memory (RAM), other non-transitory computer-readable media, or a combination thereof. In some embodiments, the first memory 208 stores a log of driving information. For example, once a driving event is initiated (e.g., movement of the vehicle 104 begins), the first electronic processor 200 stores information detailing a start time of movement in first memory 208, a location at which movement began, an end time of movement, and a location at which movement ended. The first memory 208 may further log communication with the mobile device 120 and with the server 123. In some embodiments, communication with the mobile device 120 is time stamped.

Figure 3:
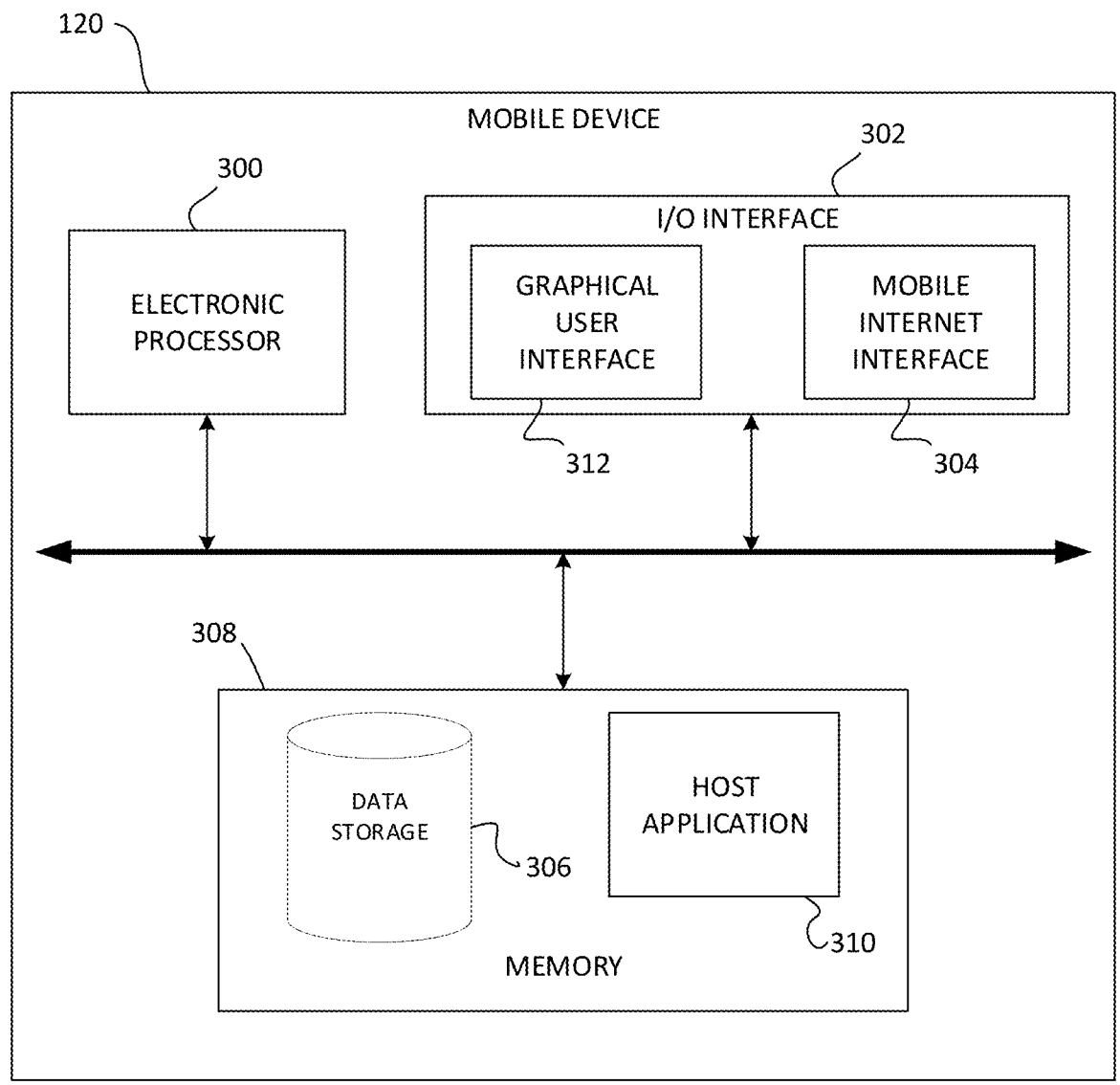
FIG. 3 is a block diagram of a mobile device in communication with at least the electronic logging device, according to some embodiments.

FIG. 3 illustrates a mobile device 120 in a block diagram format according to some embodiments. The mobile device 120 includes a second electronic processor 300 (e.g., an electronic controller, a programmable microprocessor, a microcontroller, or other additional suitable device), an input/output interface 302, and a second memory 308. The second electronic processor 300 is configured to receive instructions and data from the second memory 308 and execute, among other things, instructions related to operation of the mobile device 120. In particular, the second electronic processor 300 executes instructions stored in the second memory 308 to perform the methods described herein. The second electronic processor 300 may work in conjunction with the first electronic processor 200 to perform such methods.

The input/output interface 302 provides a communication link between the second electronic processor 300 and other components of the system 100, such as, but not limited to, the ELD 116, the network 126, and the GPS system 128. The input/output interface 302 may be similar to the interface module 212 of the ELD 116 and may include similar components. For example, the input/output interface 302 may include a mobile internet interface 304 that allows the second electronic processor 300 to communicate with the network 126. The input/output interface 302 may also include a graphical user interface 312. The graphical user interface 312 provides information related to the mobile device 120 and the ELD 116. The second electronic processor 300 may also receive user inputs via the graphical user interface 312. For example, a user of the mobile device 120 may select options related to the operation of the ELD 116 via a touchscreen of the graphical user interface 312. The user may also access the mobile application using the graphical user interface 312.

The second memory 308 includes read only memory (ROM), random access memory (RAM), other non-transitory computer-readable media, or a combination thereof. The second memory 308 includes a data storage 306 and a host application 310 (e.g., the mobile application). The data storage 306 stores data related to the ELD 116, such as the driving information related to the vehicle 104. The driving information stored in the data storage 306 may be information transferred from the first memory 208 to the second memory 308.

Figure 4:
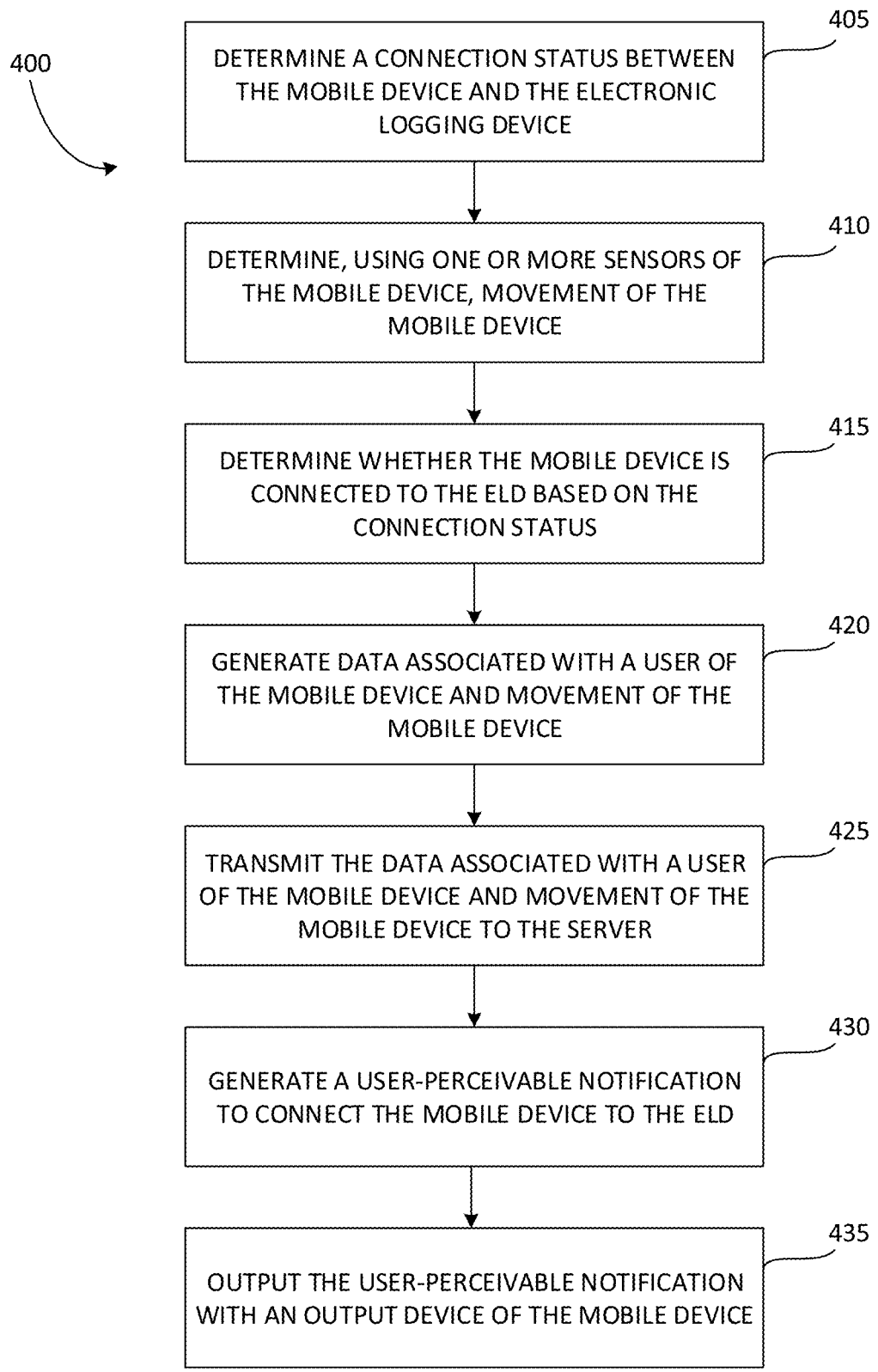
FIG. 4 is a flow chart of one embodiment of a method of monitoring a driving condition.

The ELD 116 and the mobile device 120 work in conjunction to detect driving conditions, such as driving while disconnected events. FIG. 4 provides a method 400 for monitoring a driving condition. The method 400 may be performed by the first electronic processor 200, the second electronic processor 300, or a combination thereof. At block 405, the method 400 includes determining a connection status between the mobile device 120 and the ELD 116. In some embodiments, the host application 310 may determine a wired or wireless connection between the mobile device 120 and the ELD 116. For example, the host application 310 may determine if the mobile device 120 is connected to the ELD 116 via a B-type USB cable. In another embodiment, the mobile device 120 is connected to the ELD 116 via a Bluetooth connection. When the mobile device 120 is connected to the ELD 116, the host application 310 determines the connection status is connected. If the mobile device 120 is not connected to the ELD 116, the host application 310 determines the connection status is disconnected (e.g., not connected). For example, the mobile device 120 may frequently transmit a ping to the ELD 116 for driving information related to the vehicle 104. Should the mobile device 120 fail to receive a response from the ELD 116, the host application 310 may determine the connection status is disconnected and continues to block 410. In some embodiments, the host application 310 may determine the connection status is disconnected upon failing to receive a predetermined number of responses to pings transmitted by the mobile device 120. Should the mobile device 120 receive a response, the host application 310 may determine the connection status is connected, as described in more detail below.

In some embodiments, the method 400 includes configuring a mobile application to determine a connection status between the mobile device 120 and the ELD 116. For example, a user of the mobile device 120, such as a driver of the vehicle 104, may download the host application 310 on the mobile device 120, resulting in the host application 310 being stored in the second memory 308. Upon accessing the host application 310, the mobile device 120 may receive a log-in attempt, such as a username and password. Upon successfully accessing the host application 310, the host application 310 may be configured to be associated with the driver of the vehicle 104. In some embodiments, the host application 310 requests information, such as a driver identification number (e.g., an identification of the user).

At block 410, the method 400 includes determining, using one or more sensors of the mobile device 120, movement of the mobile device 120. The one or more sensors may be, for example, signals received from the GPS system 128. The GPS system 128 may detect movement of the mobile device 120 exceeding a speed threshold, such as 5 miles per hour (MPH). For example, upon detecting the mobile device 120 is not connected to the ELD 116, the host application 310 begins requesting a location of the mobile device 120 from the GPS system 128. The request may be transmitted at a set frequency, such as once every twenty seconds. The host application 310 receives the location from the GPS system 128 and uses the received locations over time to determine the speed of the mobile device 120. In some embodiments, detecting movement of the mobile device 120 includes detecting the mobile device 120 is traveling at a speed greater than or equal to ten miles per hour over a time period of thirty seconds.

At block 415, the method 400 includes determining whether the mobile device 120 is connected to the ELD 116 based on the connection status. In some embodiments, the method 400 includes determining, based on the speed of the mobile device 120, whether a driving condition exists. For example, upon movement of the mobile device 120 exceeding the speed threshold, the host application 310 determines if the mobile device 120 and the ELD 116 are connected. If the mobile device 120 and the ELD 116 are not connected (e.g., disconnected), a driving while disconnected event may be detected.

At block 420, the method 400 includes generating (e.g., persisting) data associated with the user of the mobile device 120 and the movement of the mobile device 120 (e.g., driving information). For example, upon determining the mobile device 120 is not connected to the ELD 116, driving information detailing the driving while disconnected event is persisted. The driving information may include at least one selected from a group consisting of an identification of the user, a location of the mobile device 120 (e.g., a longitude and a latitude of the mobile device 120), a date at which movement began, and a time at which movement began.

At block 425, the method 400 includes transmitting the driving information associated with the user of the mobile device 120 and the movement of the mobile device 120 (e.g., driving information) to an external device independent of the mobile device 120 and the ELD 116. In some embodiments, the external device is the server 123. In some embodiments, the mobile device 120 transmits the driving information using the mobile internet interface 304. In some embodiments, the host application 310 transmits the driving information upon detecting at least one selected from a group consisting of movement of the mobile device 120 exceeding the speed threshold and a disconnected connection status. For example, upon detecting both movement of the mobile device 120 exceeding the speed threshold and the disconnected connection status, the host application 310 determines a driving while disconnected event is occurring. Based on detecting the driving while disconnected event, the host application 310, using the components of the mobile device 120, transmits the driving information to the server 123. In some embodiments, the host application 310 transmits the driving information to an administrator associated with the host application 310. In some embodiments, the method 400 also includes receiving, via the server 123 the data associated with the user of the mobile device 120 and the movement of the mobile device 120.

At block 430, the method 400 includes generating a user-perceivable notification to connect the mobile device 120 to the ELD 116. The user-perceivable notification may be, for example, a notification provided by the host application 310 instructing the user of the mobile device 120 (e.g., the driver) to connect the mobile device 120 to the ELD 116. In some embodiments, the user-perceivable notification is generated only when the connection status is a disconnected connection status. At block 435, the method 400 includes outputting the user-perceivable notification with an output device of the mobile device 120. The output device may be, for example, one selected from a group consisting of the graphical user interface 312, a speaker of the mobile device 120, a haptic device of the mobile device 120, or a combination thereof. For example, a push notification may be provided via the graphical user interface 312. The mobile device 120 may provide a specified ringtone via a speaker. The mobile device 120 may vibrate in response to the user-perceivable notification. In some embodiments, prior to outputting the user-perceivable notification, the host application 310 determines whether the mobile device 120 has stopped moving.

Figure 5:
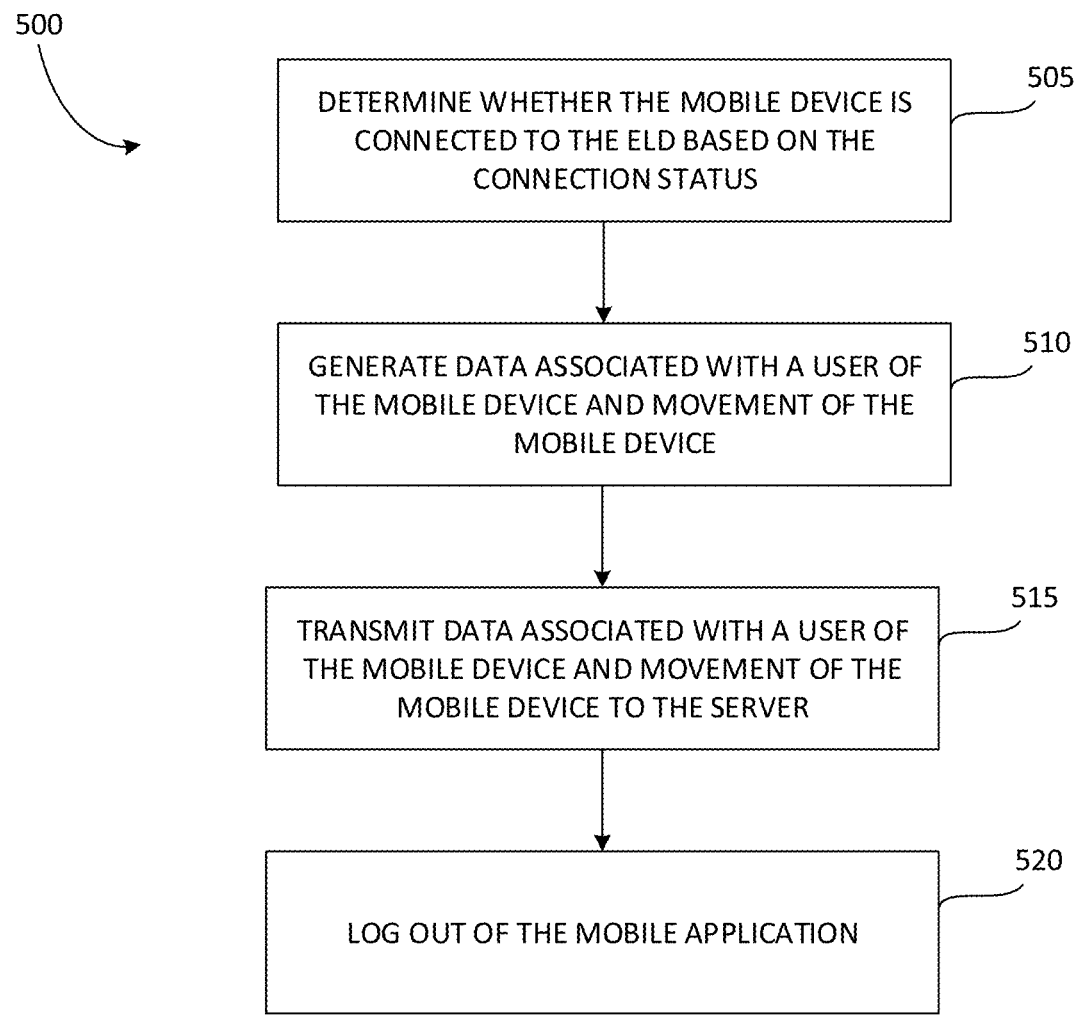
FIG. 5 is a flow chart of another embodiment of a method of monitoring a driving condition.

In some embodiments, following outputting the user-perceivable notification, the host application 310 may detect a change in connection status. For example, following outputting the user-perceivable notification indicative of a disconnected connection status, the mobile device 120 may be connected to the ELD 116. FIG. 5 illustrates a method 500 for monitoring a driving condition. Specifically, the method 500 is performed by the first electronic processor 200, the second electronic processor 300, or a combination thereof upon detecting a connected connection status. At block 505, the method 500 includes determining whether the mobile device 120 is connected to the ELD 116 based on the connection status. In some embodiments, the host application 310 determines the connection status is connected.

In some embodiments, the method 500 includes (block 510) generating data associated with the user of the mobile device 120 (e.g., the driver) and movement of the mobile device 120 (e.g., driving information). In some embodiments, the data is generated in response to detecting the mobile device 120 is connected to the ELD 116. In some embodiments, the mobile device 120 is connected to the ELD 116 following a driving while disconnected event, and the driving information is updated driving information. Updated driving information (e.g., updated data) may be data detailing the mobile device 120 and the vehicle 104 when the vehicle 104 was stopped. In some embodiments, the updated data includes at least one selected from a group consisting of an identification of the user, a location of the mobile device 120, a date at which movement ended, and a time at which movement ended.

At block 515, method 500 includes transmitting the data associated with the user of the mobile device 120 (e.g., the driver) and movement of the mobile device 120 to the server 123. In some embodiments, the data associated with the user of the mobile device 120 and movement of the mobile device 120 is updated data. The updated data may be transmitted to an administrator or a fleet leader associated with the host application 310. In some embodiments, the server 123 may use the updated data to determine how long the driving while disconnected event lasted. For example, the server 123 may subtract the time movement of the mobile device 120 ended from the time movement of the mobile device 120 began to determine a duration of the driving while disconnected event.

At block 520, the mobile device 120 logs out of the host application 310. In some embodiments, logging out of the host application 310 ends communication between the ELD 116 and the mobile device 120.

Figure 6:
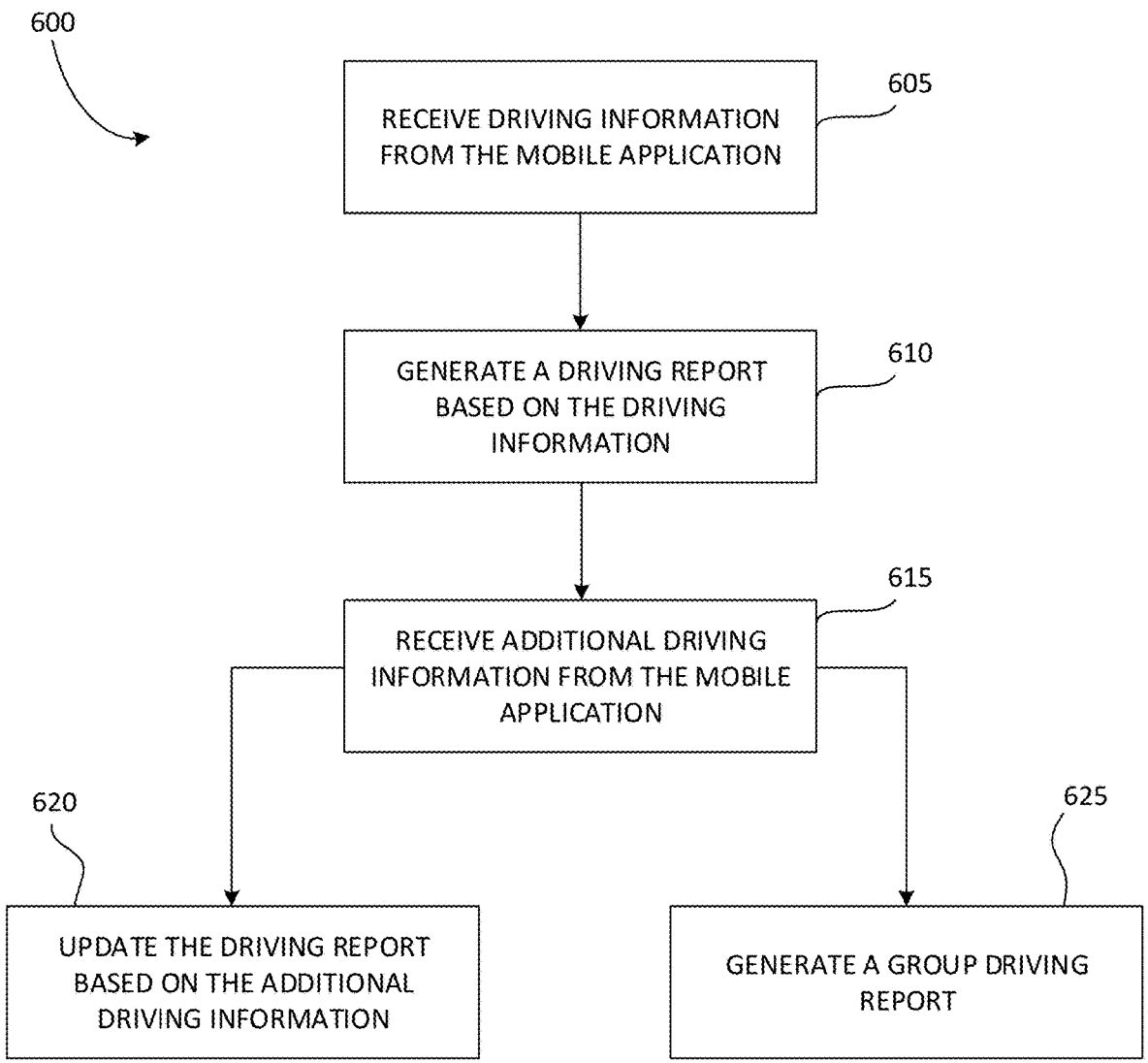
FIG. 6 is a flow chart of one embodiment of a method performed by the server of FIG. 1.

The server 123 may additionally create driving records based on the driving information received from the mobile device 120. FIG. 6 illustrates an example method 600 performed by the server 123 to create driving records. At block 605, the server 123 receives the driving information from the mobile application. For example, the server 123 receives the driving information transmitted by the host application 310, as described above.

At block 610, the server 123 generates a driving report based on the received driving information. The driving report may be, for example, a formatted report detailing the driving while disconnected event. The driving report may include, among other things, at least one selected from a group consisting of an identification of the user of the vehicle 104, a location of the mobile device 120 at which movement began, a date at which movement began, a time at which movement began, a location of the mobile device 120 at which movement ended, a date at which movement ended, and a time at which movement ended. The report may further indicate if any driving regulations have been broken by the driver of the vehicle 104.

The server 123 may continuously receive driving information from the host application 310. For example, at block 615, the server 123 receives additional driving information from the mobile application (e.g., host application 310). The additional driving information may be updated driving information as the vehicle 104 moves. Accordingly, at block 620, the server 123 updates the driving report based on the additional driving information. The additional driving information may be, for example, a current location of the mobile device 120. In some embodiments, the current location of the mobile device 120 may be time stamped. In some embodiments, the server 123 transmits the updated driving report to the administrator associated with the host application 310.

In some embodiments, the additional driving information is driving information detailing a second vehicle 104. For example, the vehicle 104 may be a single vehicle within a fleet of vehicles. Each vehicle 104 within the fleet of vehicles may include an ELD 116 and a mobile device 120 associated with the driver of the vehicle 104. Each mobile device 120 may include the host application 310 that reports driving information detailing the specific mobile device 120 and vehicle 104. Accordingly, at block 625 the server 123 generates a group driving report. The group driving report may include the driving information for a plurality of vehicles within the fleet of vehicles, such as the first and second vehicles 104. In some embodiments, the server 123 transmits the group driving report to the administrator associated with the host application 310. The group driving report may contain a list of drivers that have encountered a driving while disconnected event.

Thus, embodiments provide, among other things, systems and methods for monitoring a driving condition. Various features and advantages are set forth in the following claims.

What is claimed is:

1. A system for handling a driving while disconnected event, the system comprising:
    an electronic logging device configured to be connected to a vehicle; and
    a mobile device including an electronic processor, the electronic processor configured to:
        determine a connection status between the mobile device and the electronic logging device;
        determine, using one or more sensors of the mobile device, movement of the mobile device;
        determine whether the mobile device is connected to the electronic logging device based on the connection status; and
        in response to determining the mobile device is not connected to the electronic logging device and determining movement of the mobile device:
            generate driving information associated with a user of the mobile device and movement of the mobile device;
            transmit the driving information associated with the user of the mobile device and movement of the mobile device to an external device independent of the mobile device and the electronic logging device, the external device configured to store data associated with the electronic logging device;
            generate a user-perceivable notification to connect the mobile device to the electronic logging device; and
            output the user-perceivable notification with an output device of the mobile device.

2. The system of claim 1, wherein the electronic processor is further configured to, prior to outputting the user-perceivable notification, determine whether the mobile device has stopped moving.

3. The system of claim 1, wherein the one or more sensors of the mobile device include a global positioning system.

4. The system of claim 3, wherein the electronic processor is further configured to determine, based on a speed of the mobile device as determined by the global positioning system, whether a driving condition exists.

5. The system of claim 1, wherein the driving information includes an identification of the user, a location of the mobile device, a date at which movement began, and a time at which movement began.

6. The system of claim 1, wherein the electronic processor is further configured to:
    after determining the mobile device is not connected to the electronic logging device, determine the mobile device is connected to the electronic logging device;
    generate updated driving information associated with the user of the mobile device and movement of the mobile device; and
    transmit the updated driving information associated with the user of the mobile device and movement of the mobile device to the external device.

7. The system of claim 6, wherein the updated driving information includes an identification of the user, a location of the mobile device, a date at which movement ended, and a time at which movement ended.

8. The system of claim 1, wherein the electronic processor is further configured to:
    transmit the driving information associated with the user of the mobile device and movement of the mobile device to an administrator associated with the mobile application.

9. The system of claim 1, wherein the electronic processor determines movement of the mobile device by determining the mobile device is traveling at a speed greater than or equal to ten miles per hour over a time period of thirty seconds.

10. The system of claim 1, wherein the external device is a server configured to generate a driving report based on the driving information associated with the user of the mobile device and the movement of the mobile device.

11. A method for handling a driving while disconnected event, the method comprising:
    determining a connection status between a mobile device and an electronic logging device;
    determining, using one or more sensors of the mobile device, movement of the mobile device;
    determining whether the mobile device is connected to an electronic logging device of a vehicle based on the connection status; and
    in response to determining the mobile device is not connected to the electronic logging device and determining movement of the mobile device:
        generating driving information associated with a user of the mobile device and movement of the mobile device;
        transmitting the driving information associated with a user of the mobile device and movement of the mobile device to an external device independent of the mobile device and the electronic logging device;
        generating a user-perceivable notification to connect the mobile device to the electronic logging device; and
        outputting the user-perceivable notification with an output device of the mobile device.

12. The method of claim 11, wherein the method includes, prior to generating the user-perceivable notification to connect the mobile device to the electronic logging device, determining whether the mobile device has stopped moving.

13. The method of claim 11, wherein the one or more sensors of the mobile device includes a global positioning system.

14. The method of claim 13, further comprising:
determining, based on a speed of the mobile device as determined by the global positioning system, whether a driving condition exists.

15. The method of claim 11, wherein the driving information includes an identification of the user, a location of the mobile device, a date at which movement began, and a time at which movement began.

16. The method of claim 11, further comprising:
connecting the mobile device to the electronic logging device;
generating updated driving information associated with the user of the mobile device and movement of the mobile device; and
transmitting the updated driving information associated with the user of the mobile device and movement of the mobile device to the external device.

17. The method of claim 16, wherein the updated driving information includes an identification of the user, a location of the mobile device, a date at which movement ended, and a time at which movement ended.

18. The method of claim 11, further comprising:
transmitting the driving information associated with the user of the mobile device and movement of the mobile device to an administrator associated with the mobile application.

19. The method of claim 11, wherein detecting movement of the mobile device further includes determining the mobile device is traveling at a speed greater than or equal to ten miles per hour over a time period of thirty seconds.

20. The method of claim 11, wherein the external device is a server, and wherein the method further comprises:
generating, with the server, a driving report based on the data associated with the user of the mobile device and the movement of the mobile device.

* * * * *